United States Patent [19]

Weber

[11] 4,455,964
[45] Jun. 26, 1984

[54] MOUNT FOR HANDLING AND MASKING OPTICAL MATERIALS

[75] Inventor: Hermann Weber, Tarzana, Calif.

[73] Assignee: Techsight Corporation, Wilmington, Del.

[21] Appl. No.: 344,491

[22] Filed: Feb. 1, 1982

[51] Int. Cl.³ .............................................. B05C 13/02
[52] U.S. Cl. .................................. 118/500; 118/505; 118/504
[58] Field of Search ............... 118/500, 503, 505, 504; 51/216 LP; 427/165, 169; 269/130, 131, 132

[56] References Cited

U.S. PATENT DOCUMENTS

| 2,025,086 | 12/1935 | Black | 269/131 |
| 3,414,502 | 12/1968 | Porrata et al. | 118/503 |
| 3,642,147 | 2/1972 | Voorhies | 118/500 |

Primary Examiner—John D. Smith
Assistant Examiner—Bernard F. Plantz
Attorney, Agent, or Firm—Blakely, Sokoloff, Taylor & Zafman

[57] ABSTRACT

A mount for handling and conveying optical material is disclosed. The mount includes an elastic band disposed around the circumference of the optical material and a hanger. The hanger includes an upper generally "T" shaped suspension portion and a lower engagement hook. The engagement hook slips between the elastic band and the surface of the optical material such that the material may be suspended and conveyed by the hanger. Where a thin edge plastic lens is to be conveyed which cannot support an elastic band disposed around its circumference, a small hole is provided near the edge of and through the lens. The engagement hook of the hanger is passed through the hole and the lens may then be conveyed by the hanger. An alternate embodiment is disclosed for use where only one side of a lens is to be coated.

1 Claim, 6 Drawing Figures

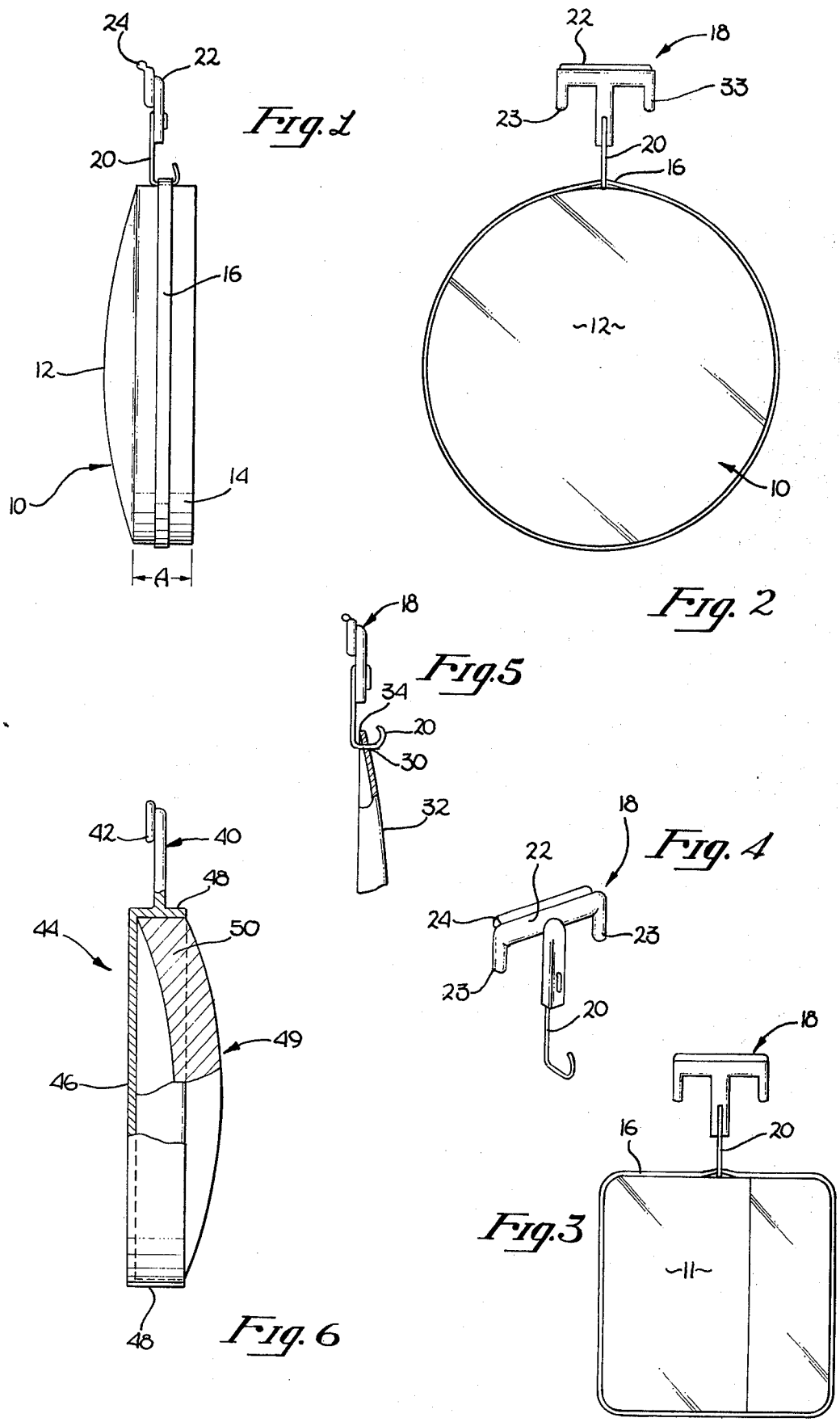

MOUNT FOR HANDLING AND MASKING OPTICAL MATERIALS

BACKGROUND OF THE INVENTION

The present invention relates to the handling and conveying of optical materials, more particularly the handling of lenses during coating processes.

Frequently, in the course of manufacturing an optical lens it is necessary to deposit a layer of optical coating material, such as for example General Electric SHC 1200 Silicone Hard Coating Resin, upon one or more surfaces of the lens element. A variety of coatings are typically used in the art to achieve the desired optical characteristics of tint, refractive index, and abrasion resistance. In order to assure optical quality, it is desirable to minimize the physical handling of the lens element during the manufacturing and coating processes. However, in the case where relatively hard optical materials are used, for example lenses composed of allyl diclycolcarbonate such as CR-39 manufactured by the Pittsburgh Plate Glass Company, it is frequently difficult to attach or mount handling means to the optical material.

A number of techniques have been used in an attempt to provide a practical solution to the problem of handling thermoset plastic and other lenses. For example, one technique which has been attempted is to bore small holes into the width of the lens material and insert rods or dowels therein to allow the lens to be handled without physically touching the lens itself. However, where a hard optical material is used, such as a thermoset plastic, it is difficult to bore into the lens without fracturing or splitting the lens element. Similarly, attempts have been made to affix handling means onto a lens by the use of an adhesive substance. Once again, these attempts have met with little success inasmuch as the adhesive typically does not retain its adhesion characteristics during the coating process. In addition, problems of contamination may arise where adhesives are used, since the adhesive material may partially dissolve into the coating mixture thereby contaminating it.

Accordingly, there exists a need for a simple, reliable and cost effective device to handle and convey optical lenses and the like during the various manufacturing and coating processes.

A primary object of the present invention, therefore, is to provide a means by which optical materials can be handled and conveyed during the manufacturing and coating process. A secondary object is to provide a means capable of handling optical materials of a variety of sizes and dimensions without modification to the handling means. An additional object of the invention is to provide a handling means for optical materials which is essentially inert and non-reactive with the various coating processes and mixtures used in the art.

SUMMARY OF THE INVENTION

A mount for handling and conveying optical material is disclosed. An elastic band circumferentially surrounds the optical material to be conveyed. A hanger is provided which includes an upper generally "T" shaped suspension portion and a lower engagement hook. The engagement hook slips between the elastic band and the surface of the optical material, such that the material may be suspended by the hanger. The material may be then be conveyed without the necessity of directly handling the optical element itself. In the case where then edge plastic optical materials are used which cannot support a circumferential elastic band, a small hole is provided near the edge of and at approximately ninety degrees through the optical material. The engagement hook is passed through this hole and the plastic lens or the like may then be conveyed by the hanger.

An alternate embodiment is disclosed for use where only one side of an optical material is to be coated. A hanger is integrally formed with an overcap. The overcap is sized so as to surround the edge of the material and provide a sealing engagement, thereby covering the surface which is to remain uncoated.

The foregoing and other objects, features and advantages of the present invention will be more readily apparent from the following detailed description, which proceeds with reference to the accompanying drawings.

Brief Description of the Drawings

FIG. 1 is a side view of a lens incorporating the mount of the present invention.

FIG. 2 is a front view of the lens and mount of FIG. 1.

FIG. 3 is a front view of a full segment bifocal lens with flat sides incorporating the mount of the present invention.

FIG. 4 is the perspective view of the hanger of the present invention.

FIG. 5 is a side view of a mount for a thin edge plastic lens.

FIG. 6 is a partial cutaway side view of an alternate embodiment of the present invention for use in processes in which only one side of a lens is to be coated.

DETAILED DESCRIPTION OF THE INVENTION

A mount for handling and conveying optical materials is disclosed. In the following description for purposes of explanation, specific numbers, materials, etc. are set forth to provide a thorough understanding of the present invention. However, it will be apparent to one skilled in the art that the present invention may be practiced without these specific details.

Referring now to FIGS. 1 and 2, a lens 10 includes an optical surface 12 and an edge 14 having a thickness "A". The thickness "A" of edge 14 will vary depending on the specific curvature and prescriptive power of the lens 10 in any given application. The present invention includes an elastic band 16 which is disposed around the circumference of lens 10, conforming to the surface of edge 14. In the presently preferred embodiment, elastic band 16 is comprised of a conventional and commercially available "rubber band", however, it will be appreciated that elastic band 16 may be comprised of any polymetric material having a high elastic yield strain. For purposes of this description, all suitable polymetric materials having the desired yield strain, whether natural or artificial, will hereinafter by referred to as "rubber". In addition, although lens 10 is depicted as having a generally circular shape, it will be apparent that the optical material being conveyed and handled may have virtually any geometric shape inasmuch as elastic band 16 will conform to the particular configuration of the optical material being processed. For example, FIG. 3 illustrates a generally rectangular full segment bifocal having flat sides incorporating the present invention.

With reference to FIG. 4, a hanger designated generally at 18 includes a lower engagement portion 20 and an upper suspension portion 22. In the presently preferrred embodiment, engagement portion 20 is formed into generrlly a hook shape and is comprised of a relatively stiff metal, such as for example, stainless steel. As best shown in FIG. 1, the hook section of the engagement portion 20 passes between the surface of edge 14 and the elastic band 16. Upper suspension portion 22 is generally "T" shaped so as to provide a convenient means for hanging lens 10 on a rack or the like during the manufacturing process. Suspension portion 22 further includes vertical tabs 23 and a horizontal lip 24 to prevent hanger 18 from being knocked off or dislodged from any rack or the like which is used. Although the Figures illustrate the suspension portion as having a "T" shape, it will be apparent that the portion 22 may be formed into a variety of shapes for any given application of the present invention. For example, suspension portion 22 may be formed into the shape of a hook which lies in a plant perpendicular to that defined by the engagement portion 20. In addition, it will be appreciated that the engagement and suspension portions may comprise a unitary structure and achieve substantially the same result.

In operation, a user desiring to utilize the present invention expands elastic band 16 around the edge 14 of the lens 10 or other optical material. Inasmuch as the band 16 is self-adjusting, the user need not alter the present invention to conform to the various shapes and sizes of optical materials typically found in the art. Hanger 18 is then attached by slipping engagement portion 20 under the elastic band 16. The resilient nature of the elastic band 16 is such that engagement portion 20 is elastically held against the surface of edge 14, thereby preventing the dislodgement of hanger 18 during handling. Once hanger 18 has been so attached, the user need not handle lens 10 while transporting or otherwise conveying the lens, or other optical material as the case may be, from one manufacturing process to the next. For example, in the case where it is desired to provide an optical coating on lens 10, the entire lens can be exposed to the optical coating solution and placed in an appropriate drying area or rack, without the necessity that the user physically handle the lens element during the critical coating and drying periods. Rather, the user can convey and handle each lens 10 by the hanger 18 throughout the coating process. Once the manufacturing process has been completed such that the use of the present invention is no longer required, it will be appreciated that elastic band 16 may be discarded or if desired reused, inasmuch as elastic band 16 has been found in practice to be relatively inert and non-reactive with the coating mixtures used in the art.

In the case where thin edge plastic lenses, typically referred to as "plus lenses", are to be handled and conveyed, the thickness of the lens edge may be such that it cannot support the use of an elastic band around its circumference. In general, it has been found that the use of an elastic band is practicable only so long as the lens edge width equals or exceeds the width of the elastic band. With reference to FIG. 5, a mount for handling and conveying thin edge optical materials is disclosed. Prior to the desired coating or manufacturing process, a small hole 30 is provided through an upper portion of lens 32 near its edge 34. Presently, hole 30 is drilled, however, it will be appreciated that the hole may be formed using a variety of methods known in the art.

Hole 30 is sized such that its diameter slightly exceeds the diameter of engagement portion 20 of hanger 18. Thus, by passing the engagement portion 20 through hole 30, thin lens 32 may be handled and conveyed by hanger 18 as previously discussed relative to the embodiment of FIG. 1. After the manufacturing and coating processes have been completed, the lens may be ground and sized as is conventionally done. By placing hole 30 near the edge of the lens, no optical degradation of the lens occurs inasmuch as that portion of the lens surface where hole 30 is located does not form a part of the finished lens element.

Frequently, only one surface of a lens need be coated for the particular application in which it will be used. For example, typically during the initial manufacturing of optical blanks, the blanks are coated with an anti-abrasion or tinting coating prior to grinding. The inner surface of the blank is ground to achieve the desired optical refractive properties without disturbing the anti-abrasion or other coating on the outer surface. Thus, it is wasteful to coat the inner surface of the lens inasmuch as the deposited coating will simply be ground off.

Referring now to FIG. 6, an alternate embodiment of the present invention is disclosed which provides a means whereby only one side of a lens is coated. A hanger 40, which includes tabs 42, is integrally formed with an overcap 44. The hanger may be comprised of a variety of relatively rigid materials, such as for example plastic or metal. Presently, hanger 40 is formed out of the same material as overcap 44, and as such essentially comprises an extension of the overcap. Overcap 44 is typically circular and is sized such that its inner diameter generrlly equals the outer diameter of the lens to be coated. Overcap 44 includes a body 46 and a lip 48 as illustrated in FIG. 6. Overcap 44 is, in the present embodiment, comprised of a resilient and deformable material such as plastic, however it will be appreciated that the overcap body and lip may be comprised of other suitable materials.

A user desiring to coat only one surface of a lens 49 press fits lip 48 over the lens edge 50, such that the surface which is to remain uncoated is covered by overcap 44. Inasmuch as the circumference of overcap 44 is sized such that lip 48 must deform somewhat in order to encircle the outer circumference of the lens, a sealing engagement is thereby achieved between the lip and the edge. Once attached, lens 10 may be handled and conveyed simply by using the integrally formed hanger 40 throughout the various coating processes.

Although in the preferred embodiment hanger 40 is described as being integrally formed with the overcap 44, it will be apparent that the overcap may be utilized without the hanger. Furthermore, it will be appreciated that the mount of FIG. 1 may be used in place of the integral hanger, thereby achieving substantially the same result. For example, once lip 48 has been pressed into lens 49, elastic band 16 may then be expanded around the lip 48. Hanger 18 may then be attached as previously discussed and lens 49 thereby conveyed.

Thus, a mount for handling and conveying optical materials has been disclosed. The present invention is simple, reliable and cost effective, and permits a user to handle and convey optical materials during the manufacturing process without physically contacting the optical element itself. Although the present invention has been described in detail, it is to be understood that various changes, substitutions and alterations can be made therein without departing from the spirit and scope of the invention as disclosed above.

I claim:

1. A mount for handling and conveying optical material and preventing the deposition of a coating on at least one surface of said optical material, comprising:
   an overcap sealably covering an exposed surface of said material, said overcap comprising a generally circular surface, and a lip portion which sealably surrounds the circumference of said material;
   a hanging means for suspending said optical material, comprising:
   an elastic band circumferentially surrounding said overcap;
   a lower engagement portion disposed between said overcap and said band; and
   an upper engagement portion attached to said lower portion for suspending and conveying said material.

* * * * *